(12) United States Patent
Gal (10) Patent No.: US 7,867,322 B2
(45) Date of Patent: Jan. 11, 2011

(54) USE OF $SO_2$ FROM FLUE GAS FOR ACID WASH OF AMMONIA

(75) Inventor: Eli Gal, Cupertino, CA (US)

(73) Assignee: ALSTOM Technology Ltd, Baden (CH)

( * ) Notice: Subject to any disclaimer, the term of this patent is extended or adjusted under 35 U.S.C. 154(b) by 374 days.

(21) Appl. No.: 12/015,759

(22) Filed: Jan. 17, 2008

(65) Prior Publication Data

US 2008/0178733 A1 Jul. 31, 2008

Related U.S. Application Data

(60) Provisional application No. 60/887,357, filed on Jan. 31, 2007.

(51) Int. Cl.
*B01D 53/14* (2006.01)
(52) U.S. Cl. .............. 95/199; 95/229; 95/232; 95/235; 95/236; 423/220; 423/234; 423/243.01; 423/243.06
(58) Field of Classification Search ............ 95/199, 95/229, 232, 235, 236; 423/243.01, 243.06, 423/220, 234
See application file for complete search history.

(56) References Cited

U.S. PATENT DOCUMENTS

| | | | | |
|---|---|---|---|---|
| 3,969,482 A | * | 7/1976 | Teller | 423/235 |
| 4,369,167 A | * | 1/1983 | Weir, Jr. | 423/210 |
| 4,541,999 A | * | 9/1985 | Bechthold et al. | 423/235 |
| 4,834,959 A | * | 5/1989 | Kent et al. | 423/243.09 |
| 6,093,288 A | * | 7/2000 | Izutsu et al. | 204/157.3 |
| 6,302,945 B1 | * | 10/2001 | Altman et al. | 96/44 |
| 2003/0140789 A1 | * | 7/2003 | Koros et al. | 96/10 |
| 2008/0050299 A1 | * | 2/2008 | Bedell et al. | 423/243.06 |

FOREIGN PATENT DOCUMENTS

| | | |
|---|---|---|
| EP | 1733782 A1 | 12/2006 |
| WO | WO 2006/022885 | 3/2006 |
| WO | WO 2006/136016 | 12/2006 |

OTHER PUBLICATIONS

PCT International Search Report and the Written Opinion of the International Searching Authority dated Jul. 15, 2008—(PCT/US2008/051536).

* cited by examiner

*Primary Examiner*—Duane Smith
*Assistant Examiner*—Thomas Bennett McKenzie
(74) *Attorney, Agent, or Firm*—Timothy J. Olson (57) ABSTRACT

A gas cleaning system, which is operative for cleaning a process gas containing carbon dioxide and sulphur dioxide, comprises a combined cooling and cleaning system (16), and a $CO_2$-absorber. The combined cooling and cleaning system (16) comprises a first gas-liquid contacting device (50) located upstream of the $CO_2$-absorber and operative for cooling the process gas by means of a cooling liquid, and for absorbing into the cooling liquid sulphur dioxide of the process gas, such that a cooling liquid containing sulphate is obtained. The combined cooling and cleaning system (16) further comprises a second gas-liquid contacting device (94) located downstream of the $CO_2$-absorber and operative for removing ammonia from the process gas, which has been treated in the $CO_2$-absorber, by means of bringing the process gas containing ammonia into contact with the cooling liquid containing sulphate.

17 Claims, 3 Drawing Sheets

USE OF SO₂ FROM FLUE GAS FOR ACID WASH OF AMMONIA

CROSS REFERENCE TO RELATED APPLICATION(S)

This application claims priority to copending U.S. provisional application entitled, "USE OF SO₂ FROM FLUE GAS FOR ACID WASH OF AMMONIA," having U.S. Ser. No. 60/887,357, filed Jan. 31, 2007, the disclosure of which is entirely incorporated herein by reference.

FIELD OF THE INVENTION

The present invention relates to a method of cleaning a process gas containing carbon dioxide and sulphur dioxide, said method including removing, at least partly, carbon dioxide from the process gas by means of, in a first step, cooling the process gas, and, in a second step, bringing the cooled process gas into contact with an ammoniated solution or slurry absorbing at least a part of the carbon dioxide.

The present invention also relates to a gas cleaning system which is operative for cleaning a process gas containing carbon dioxide and sulphur dioxide, said gas cleaning system comprising a combined cooling and cleaning system, which is operative for cooling the process gas, and a carbon dioxide removal system comprising a CO₂-absorber which is operative for removing, at least partly, carbon dioxide from the process gas by bringing the cooled process gas into contact with an ammoniated solution or slurry absorbing at least a part of the carbon dioxide.

BACKGROUND OF THE INVENTION

In the combustion of a fuel, such as coal, oil, peat, waste, etc., in a combustion plant, such as a power plant, a hot process gas is generated, such a hot process gas, often referred to as a flue gas, containing, among other components, carbon dioxide, CO₂. The negative environmental effects of releasing carbon dioxide to the atmosphere have been widely recognised, and have resulted in the development of processes adapted for removing carbon dioxide from the hot process gas generated in the combustion of the above mentioned fuels.

WO 2006/022885 describes one such process for absorbing carbon dioxide from a flue gas. In the process described in WO 2006/022885 the flue gas is first treated by means of conventional air pollution control processes, like particulate collectors, NOx and SO2 control, acid mist capturing device and more. The flue gas then, after the conventional air pollution control processes, has a temperature of about 40-70° C. The flue gas is then cooled down to, preferably, 0-20° C. by means of direct contact cooling, in which the flue gas is cooled by means of cold water. The flue gas is then brought to a CO₂ absorber, in which the flue gas is brought into contact with a low temperature ammoniated slurry or solution, which is carbon dioxide lean. The carbon dioxide is absorbed in the ammoniated slurry or solution, and a clean flue gas, containing very small amounts of pollutants and carbon dioxide, leaves the CO₂ absorber. The carbon dioxide rich ammoniated slurry or solution is regenerated in a regenerator, in which the carbon dioxide is stripped, at a temperature of about 50-200° C. and under high pressure, to form a concentrated carbon dioxide rich stream.

A problem of the process described in WO 2006/022885 is that the clean flue gas released from the CO₂ absorber will contain a substantial amount of ammonia. In WO 2006/022885 it is described that the ammonia concentration of the clean flue gas can be kept as low as possible by means of low flue gas temperature in the CO₂ absorber, low NH₃/CO₂ ratio in the slurry of the CO₂ absorber, and a cold water wash of the flue gas before releasing it to the atmosphere. Such water wash can reduce the ammonia concentration in the clean flue gas to the range of about 100-1000 ppm, and preferably to the range of about 100-400 ppm, which is still too high for discharging such a flue gas to the atmosphere.

SUMMARY OF THE INVENTION

An object of the present invention is to provide an efficient and environmentally acceptable method of removing carbon dioxide from a process gas.

This object is achieved by means of a method of cleaning a process gas containing carbon dioxide and sulphur dioxide, said method including removing, at least partly, carbon dioxide from the process gas by means of, in a first step, cooling the process gas, and, in a second step, bringing the cooled process gas into contact with an ammoniated solution or slurry absorbing at least a part of the carbon dioxide, the method being characterised in said first step comprising cooling the process gas by means of bringing the process gas into direct contact with a cooling liquid, and absorbing into the cooling liquid at least a part of the sulphur dioxide of the process gas, such that a cooling liquid containing sulphate is obtained, said second step comprising contacting the cooled process gas with the ammoniated solution or slurry to remove, at least partly, carbon dioxide from the process gas, and to form a process gas containing ammonia, and in a third step removing, at least partly, ammonia from the process gas containing ammonia by means of bringing the process gas containing ammonia into direct contact with the cooling liquid containing sulphate.

An advantage of this method is that the carbon dioxide is removed from the process gas in an efficient manner, without causing emissions of other substances, such as ammonia, to the environment. The sulphur dioxide of the process gas being cooled in the first step is absorbed and is utilized as a substance making it possible to effectively remove, in the third step, the ammonia from the process gas containing ammonia. One acid component of the process gas, the sulphur dioxide, is thus utilized for absorbing one alkaline component, i.e., the ammonia, that could be said to form a contaminant added to the process gas in the second step, such that these two components do in fact neutralize each other. Hence, the process gas is very effectively cleaned, from both carbon dioxide, sulphur dioxide, and ammonia, such that the process gas may subsequently be released to the atmosphere without negative effects on the environment, or on human health.

According to one embodiment the cooling liquid containing sulphate is, in the third step, cooled by means of the process gas containing ammonia, the thereby cooled cooling liquid being utilized in the first step for the cooling of the process gas. The cooling, in the third step, of the cooling liquid containing sulphate makes it more suitable for being re-used as a cooling medium in said first step, thereby closing, to a large extent, the liquid balance of the process. The process gas containing ammonia will be heated by the cooling liquid containing sulphate, making the process gas more suitable for being released to the atmosphere.

According to another embodiment said first step comprises cooling the process gas and absorbing sulphur dioxide in the cooling liquid by means of a first gas-liquid contacting device, and said third step comprises removing ammonia from the process gas containing ammonia by means of the cooling liquid containing sulphate by means of a second gas-liquid contacting device. The gas-liquid contacting devices improves the direct contact between gas and liquid, and increases the exchange of heat between the liquid and the gas, and the absorption of sulphur dioxide and ammonia in the cooling liquid.

According to one embodiment, in said third step, the ammonia of the process gas containing ammonia and the sulphate of the cooling liquid containing sulphate at least partly react to form ammonium sulphate in aqueous solution. Ammonium sulphate is rather harmless to human health, and is also rather inert, such that re-evaporation of sulphur dioxide from the cooling liquid is not likely. The ammonium sulphate may, after proper treatment, be used as a fertilizer.

According to one embodiment the cooling liquid utilized for cooling the process gas in the first step is treated in a heat exchanger for recovering energy. An advantage of this embodiment is that the energy may be used in another part of the process, for example in a regenerator in which the $CO_2$-rich slurry or solution from the $CO_2$-absorber is regenerated.

According to one embodiment the pH-value of the cooling liquid containing sulphate, such cooling liquid being obtained in the first step, is controlled to be in the range of pH about 4-6. This pH-range has been found to be suitable to obtain a cleaned process gas containing a low concentration of pollutants, including ammonia.

According to one embodiment the process gas, prior to being cooled in said first step, is treated in a sulphur dioxide removal device to remove a portion of its sulphur dioxide content, the efficiency of the sulphur dioxide removal device being controlled to obtain a process gas, to be treated in said first step, which comprises an amount of sulphur dioxide which has a relation to the amount of ammonia of the process gas containing ammonia, to be treated in said third step, of about 1:2 on a molar basis. An advantage of this embodiment is that the amount of sulphur dioxide removed in the first step can be controlled to correspond to the amount needed in the cooling liquid containing sulphate for absorbing the ammonia in the third step.

According to one embodiment the second step comprises partly removing ammonia from the process gas containing ammonia by means of a water wash device, the efficiency of the water wash device being controlled to obtain a process gas containing ammonia, to be treated in said third step, which comprises an amount of ammonia which has a relation to the amount of sulphur dioxide of the process gas, to be treated in said first step, of about 2:1 on a molar basis. An advantage of this embodiment is that the amount of ammonia to be removed in the third step can be controlled to correspond to the amount of sulphur dioxide absorbed in the cooling liquid, and forming the cooling liquid containing sulphate, in the first step.

According to one embodiment sulphuric acid is added to the cooling liquid to control its pH-value. An advantage of this embodiment is that sulphuric acid provides for increasing, quickly and at low cost, the ammonia removal capability of the cooling liquid containing sulphate, e.g., in situations when the amount of sulphur dioxide removed in the first step is not sufficient in view of the amount of ammonia to be removed in the third step.

A further object of the present invention is to provide a gas cleaning system which is operative for an efficient and environmentally acceptable removal of carbon dioxide from a process gas.

This object is achieved by means of a gas cleaning system which is operative for cleaning a process gas containing carbon dioxide and sulphur dioxide, said gas cleaning system comprising a combined cooling and cleaning system, which is operative for cooling the process gas, and a carbon dioxide removal system comprising a $CO_2$-absorber which is operative for removing, at least partly, carbon dioxide from the process gas by bringing the cooled process gas into contact with an ammoniated solution or slurry absorbing at least a part of the carbon dioxide, the gas cleaning system being characterised in the combined cooling and cleaning system comprising a first gas-liquid contacting device, which is located upstream of the $CO_2$-absorber with respect to the flow direction of the process gas and which is operative for cooling the process gas by means of bringing the process gas into direct contact with a cooling liquid, and absorbing into the cooling liquid at least a part of the sulphur dioxide of the process gas, such that a cooling liquid containing sulphate is obtained, the combined cooling and cleaning system further comprising a second gas-liquid contacting device, which is located downstream of the $CO_2$-absorber with respect to the flow direction of the process gas, and which is operative for removing, at least partly, ammonia from the process gas, which has been treated in the $CO_2$-absorber and which comprises ammonia, by means of bringing the process gas containing ammonia into direct contact with the cooling liquid which contains sulphate and has been formed in said first gas-liquid contacting device.

An advantage of this gas cleaning system is that it is efficient for removing sulphur dioxide, and for utilizing the removed sulphur dioxide, in the form of sulphate contained in the cooling liquid, for removing ammonia from the process gas that has been treated in the carbon dioxide removal system, and which contains, as a consequence of such treatment, ammonia. Hence, the need for external additives, such as sulphuric acid, will be very limited. The two gas-liquid contacting devices will also, in addition to being absorbers for sulphur dioxide and ammonia, respectively, function as heat transfer devices being operative for cooling the process gas, prior to being treated in the carbon dioxide removal system, and heating the process gas, prior to being released to the atmosphere, respectively.

According to one embodiment the second gas-liquid contacting device is operative for cooling the cooling liquid containing sulphate by means of the process gas containing ammonia, a liquid transport device being operative for recirculating at least a part of the cooled cooling liquid from the second gas-liquid contacting device to the first gas-liquid contacting device. An advantage of this embodiment is that the liquid balance is almost closed, such that the cooling liquid is re-used in the first gas-liquid contacting device after being cooled in the second gas-liquid contacting device.

According to one embodiment the combined cooling and cleaning system comprises a control device which is operative for controlling the pH-value of the cooling liquid containing sulphate. Controlling the pH-value of the cooling liquid containing sulphate improves the control of the removal of ammonia from the process gas containing ammonia in the second gas-liquid contacting device.

Further objects and features of the present invention will be apparent from the description and the claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. The invention will now be described in more detail with reference to the appended drawings in which.

DESCRIPTION OF PREFERRED EMBODIMENTS

As used throughout the present description the unit "ppm" refers to parts per million on a volume basis.

Figure 1:
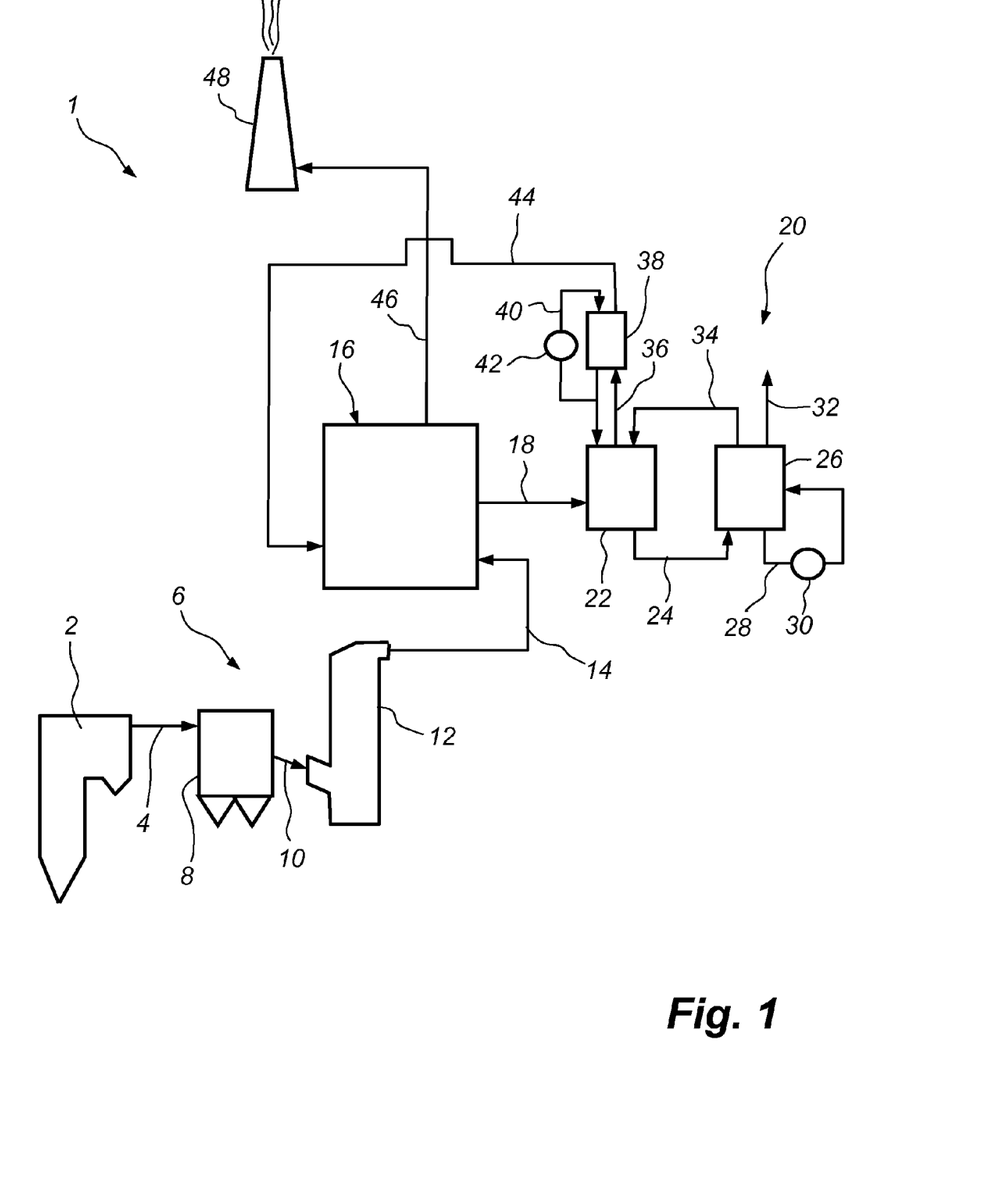
FIG. 1 is a schematic side view depicting an example of a power plant.

FIG. 1 is a schematic side view and illustrates a power plant 1, as seen from the side thereof. The power plant 1 comprises a boiler 2. During the combustion of a fuel, such as coal or oil, a hot process gas, often referred to as a flue gas, is generated in the boiler 2. The flue gas, which contains polluting substances, including dust particles, sulphur dioxide, $SO_2$, sulphur trioxide, $SO_3$, and carbon dioxide, $CO_2$, leaves the boiler 2 via a gas duct 4. The gas duct 4 is operative for forwarding the flue gas to a conventional air pollution control system 6. The conventional air pollution control system 6 includes a dust collector 8, in the form of, e.g., an electrostatic precipitator, an example of which is described in U.S. Pat. No. 4,502,872. Furthermore, the conventional air pollution control system 6 comprises a duct 10 which is operative for forwarding the flue gas from the dust collector 8 to a sulphur dioxide removal device 12, sometimes referred to as a Flue Gas Desulfurization system (FGD), in the form of a wet scrubber. An example of a wet scrubber can be found in EP 0 162 536 A1. In such a wet scrubber the sulphur dioxide is removed from the flue gas by means of contacting the flue gas with a lime stone slurry. Flue gas in coal or oil fired power plants contains $SO_2$, which is formed when sulphur-laden coal or oil is combusted. In a typical power plant about 90-98% of the $SO_2$ is captured in the sulphur dioxide removal device 12, and the flue gas leaving such a sulphur dioxide removal device 12 typically contains about 20-200 ppm of $SO_2$. The sulphur dioxide removal device 12 could also be a so-called dry system, an example of which is illustrated in WO 2004/026443 A1, in which the flue gas is contacted with a moistened absorbent material.

The conventional air pollution control system 6 could comprise further devices, such as a selective catalytic reduction reactor, e.g., of the type described in U.S. Pat. No. 5,555,849, for removing nitrogen oxides from the flue gas, such further devices not being illustrated in FIG. 1 for reasons of clarity of illustration. The flue gas, which comprises very small amounts of most pollutants, but still most of the original concentration of carbon dioxide, leaves the conventional air pollution control system 6 via a duct 14. The duct 14 is operative for forwarding the flue gas to a combined cooling and cleaning system 16, which will be described in more detail hereinafter. The flue gas forwarded in the duct 14 typically has a temperature of 49-60° C. (120-140° F.), is at ambient pressure, and is saturated with water.

The flue gas leaves the combined cooling and cleaning system 16 via a duct 18. The flue gas in the duct 18 has a temperature of 0-20° C., preferably 0-10° C. The duct 18 is operative for forwarding the flue gas to a carbon dioxide removal system 20. The carbon dioxide removal system 20 is rather similar to the carbon dioxide removal system described with reference to FIG. 1 of WO 2006/022885, with application number PCT/US2005/012794. The type of carbon dioxide removal system described in WO 2006/022885 is sometimes referred to as the Chilled Ammonia Process, CAP. A flue gas temperature of 0-20° C., preferably 0-10° C., is suitable for the carbon dioxide removal system 20.

Hence, the carbon dioxide removal system 20 comprises, with reference to FIG. 1 of the present application, a $CO_2$-absorber 22 in which the flue gas is brought into contact with an ammoniated slurry or solution in a similar manner as described in WO 2006/022885. A pipe 24 is operative for forwarding, by means of a high pressure pump, not illustrated in FIG. 1 for reasons of clarity, a $CO_2$-enriched slurry or solution from the $CO_2$-absorber 22 to a regenerator 26. Heat is provided to the regenerator 26 by heating stream 28 in heater 30. The high pressure and high temperature in the regenerator 26 causes the release of high-pressure gaseous $CO_2$, stream 32. A pipe 34 is operative for returning $CO_2$-lean ammoniated solution or slurry, that has been cooled in a cooler, not illustrated in FIG. 1, from the regenerator 26 to the $CO_2$-absorber 22.

A duct 36 is operative for forwarding flue gas, having a low concentration of carbon dioxide, from the $CO_2$-absorber 22 to a water wash vessel 38, which is optional and which is operative for removing ammonia, $NH_3$, from the flue gas that has been treated in the $CO_2$-absorber 22. The water wash vessel 38 could have a similar design as the water wash vessel described as reference 356 in WO 2006/022885 with reference to FIG. 3 of that application. Returning to FIG. 1 of the present application, a stream 40 of cold water or cold and slightly acidic solution is cooled in a heat exchanger 42 and is supplied to the water wash vessel 38. A duct 44 is operative for forwarding flue gas, that has been cleaned in the water wash vessel 38, to the combined cooling and cleaning system 16 for further cleaning, as will be described in more detail hereinafter.

A duct 46 is operative for forwarding flue gas, that has been cleaned further in the combined cooling and cleaning system 16, to a stack 48 which releases the cleaned flue gas to the atmosphere.

Figure 2:
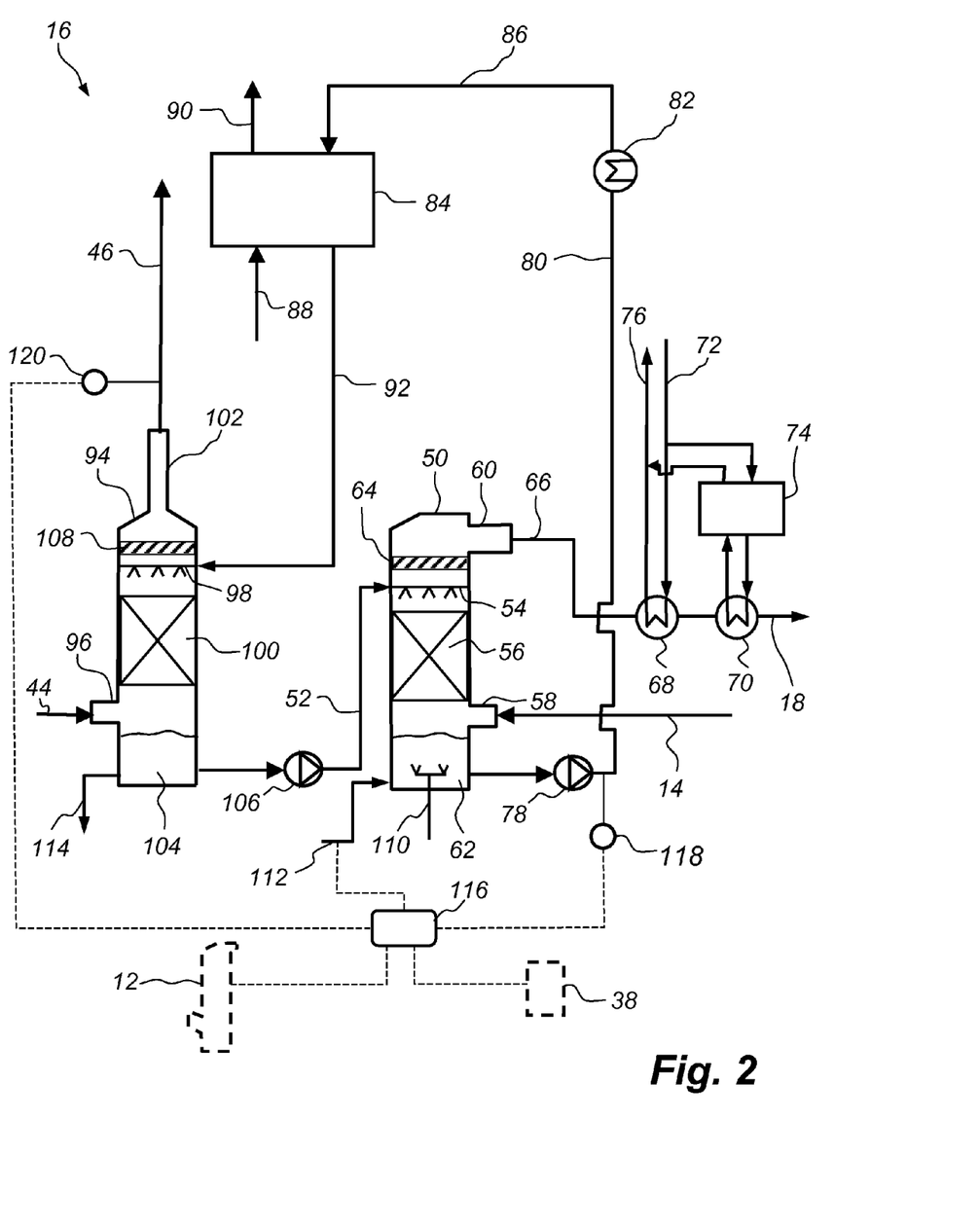
FIG. 2 is a schematic side view depicting an example of a combined cooling and cleaning system.

FIG. 2 illustrates the combined cooling and cleaning system 16 in more detail. The flue gas from the sulphur dioxide removal device 12 enters the combined cooling and cleaning system 16 via the duct 14, which has been described hereinbefore with reference to FIG. 1. The flue gas first reaches a first gas-liquid contacting device in the form of a first direct contact cooler 50 having the shape of a tower. The first direct contact cooler 50 is operative for efficient cooling of the flue gas by contacting it directly with a cooling liquid in the form of cooling water having a temperature of, for example, 20.5° C. [69° F.], which is supplied via a pipe 52. A set of nozzles 54 is operative for distributing the cooling water over a contacting device 56, which could have the form of a structured packing, or another suitable type of gas-liquid contacting filling. The flue gas, having a temperature of, for example, 57° C. [135° F.], enters the first direct contact cooler 50 via a gas inlet 58 and is forwarded upwards, through the contacting device 56. The flue gas leaves the first direct contact cooler 50 at a temperature of 21° C. [70° F.] via a gas outlet 60. The cooling water and the flue gas are contacted with each other in the contacting device 56 under exchange of heat. The warm cooling water is collected in a tank 62 located at the bottom of the first direct contact cooler 50. The cooling water collected in the tank 62 has a temperature of, for example, 55.5° C. [132° F.]. Above the set of nozzles 54 a mist eliminator 64 is located for the purpose of collecting water droplets entrained by the flue gas.

The first direct contact cooler 50 is a counter-current gas-liquid contacting vessel designed to achieve low temperature difference on both ends of the vessel. The temperature difference at the top of the first direct contact cooler 50, i.e., between the cold cooling water supplied via the pipe 52 and the flue gas about to leave the first direct contact cooler 50 via the gas outlet 60, is designed to be less than 3° C. [5° F.], and preferably about 0.6° C. [1° F.]. Similarly, the temperature difference at the bottom of the first direct contact cooler 50, i.e., between the warm cooling water collected in the tank 62 for further transport and the flue gas about to enter the first direct contact cooler 50 via the gas inlet 58, is designed to be less than 3° C. [5° F.], and preferably about 0.6° C. [1° F.]. Lowering the temperature difference results in maximum cooling of the flue gas and maximum heating of the cooling water. Lowering the temperature of the flue gas, that is about to leave the first direct contact cooler 50 via the gas outlet 60, saves cooling power downstream in the process.

A duct 66 is operative for forwarding the flue gas from the gas outlet 60 to a first indirect cooler 68 and a second indirect cooler 70. A pipe 72 supplies cooling liquid to the first indirect cooler 68 and to a chiller 74. The chiller 74 cools, further, the cooling liquid before supplying it to the second indirect cooler 70. A pipe 76 returns the spent cooling liquid from the first and second indirect coolers 68, 70. The cooling liquid circulating in the pipes 72, 76 could be cooled in a cooling tower, not illustrated in FIG. 2

The duct 18, which has been described hereinbefore with reference to FIG. 1, is operative for forwarding the flue gas, having the desired temperature of 0-20° C., preferably 0-10° C., from the second indirect cooler 70 to the carbon dioxide removal system 20, which has also been described hereinbefore with reference to FIG. 1.

A pump 78 is operative for forwarding, via a pipe 80, the warm cooling water collected in the tank 62 of the first direct contact cooler 50 to a heat exchanger 82. In the heat exchanger 82 the warm cooling water is cooled from about 55.5° C. [132° F.] to, for example, about 35° C. [95° F.]. Hence, the warm cooling water is used as a source of heat to be utilized elsewhere in the process. Thus, the heat, which otherwise would be wasted and rejected in a cooling tower 84, is transferred to the heat exchanger 82 and is used for regeneration. Higher temperature of the warm cooling water forwarded in the pipe 80 improves waste energy utilization and thus improves the overall energy efficiency of the power plant 1.

A pipe 86 is operative for forwarding the cooling water from the heat exchanger 82 to the cooling tower 84. Heat not rejected for useful purposes in the heat exchanger 82 is rejected as waste energy in the cooling tower 84. Ambient air is supplied via an inlet duct 88 to the cooling tower 84 and cools the warm cooling water in accordance with the well-known principles of cooling towers. The heated ambient air leaves the cooling tower 84 via an outlet duct 90. The cooled cooling liquid, having a temperature of about 25° C. [77° F.], leaves the cooling tower 84 via a pipe 92.

The combined cooling and cleaning system 16 further comprises a second gas-liquid contacting device in the form of a second direct contact cooler 94 having the shape of a tower. The second direct contact cooler 94 is operative for efficient cooling of the cooling liquid, which is supplied to the second direct contact cooler 94 by means of the pipe 92, by contacting the cooling liquid directly with the cool flue gas that has passed through the entire carbon dioxide removal system 20, described with reference to FIG. 1, and which is forwarded to a gas inlet 96 of the second direct contact cooler 94 by means of the duct 44, which has been described hereinbefore with reference to FIG. 1. The flue gas, from which most of the carbon dioxide has been removed in the carbon dioxide removal system 20, has, when it enters the gas inlet 96, a temperature of, for example, 5° C. [41° F.].

A set of nozzles 98 is operative for distributing the cooling water supplied by the pipe 92 over a contacting device 100, which could be similar to the contacting device 56. The flue gas entering via the gas inlet 96 is forwarded upwards, through the contacting device 100, and leaves the second direct contact cooler 94 at a temperature of 24.5° C. [76° F.] via a gas outlet 102. The gas outlet 102 is connected to the duct 46, which has been described hereinbefore with reference to FIG. 1 and which is operative for forwarding the cleaned flue gas from the combined cooling and cleaning system 16 to the stack 48. The cooling water and the flue gas are contacted with each other in the contacting device 100 under exchange of heat. The cooled cooling water is collected in a tank 104 located at the bottom of the second direct contact cooler 94. The cooling water collected in the tank 104 has a temperature of, for example, 20.5° C. [69° F.], as mentioned hereinbefore with reference to the pipe 52. A pump 106 is operative for forwarding the cold cooling water from the tank 104 to the first direct contact cooler 50 via the pipe 52. Above the set of nozzles 98 a mist eliminator 108 is located for the purpose of collecting water droplets entrained by the flue gas.

The second direct contact cooler 94 is a counter-current gas-liquid contacting vessel designed to achieve low temperature difference on both ends of the vessel. The temperature difference at the top of the second direct contact cooler 94, i.e., between the cooling water supplied via the pipe 92 and the flue gas about to leave the second direct contact cooler 94 via the gas outlet 102, is designed to be less than 3° C. [5° F.], and preferably about 0.6° C. [1° F.]. Higher temperature in the clean flue gas improves its buoyancy and reduces the reheat load, i.e., the heat input required to heat the clean flue gas to a certain temperature, if required.

The below tables summarizes the temperature changes that the cooling water and the flue gas undergo while passing through the combined cooling and cleaning system 16:

TABLE 1

Flue gas temperatures at different locations

| Flue gas | Ref. No | Temp [° C.] | Temp [° F.] |
|---|---|---|---|
| Inlet first direct contact cooler | 14 | 57 | 135 |
| Outlet first direct contact cooler | 66 | 21 | 70 |
| After further cooling | 18 | 0-10 | 32-50 |
| Inlet second direct contact cooler | 44 | 5 | 41 |
| Outlet second direct contact cooler | 46 | 24.5 | 76 |

TABLE 2

Cooling water temperatures at different locations

| Cooling water | Ref. No | Temp [° C.] | Temp [° F.] |
|---|---|---|---|
| Inlet first direct contact cooler | 52 | 20.5 | 69 |
| Outlet first direct contact cooler | 80 | 55.5 | 132 |
| After heat exchanger | 86 | 35 | 95 |
| Inlet second direct contact cooler | 92 | 25.0 | 77 |
| Outlet second direct contact cooler | 52 | 20.5 | 69 |

To conclude, the first direct contact cooler 50 cools the flue gas coming from the conventional air pollution control system 6, described hereinbefore with reference to FIG. 1, by means of cooling water, a cooling water which is cooled in a heat exchanger 82, and a cooling tower 84. The cooling water is further cooled in the second direct contact cooler 94 by means of being contacted with the cool flue gas coming from the carbon dioxide removal system 20, described hereinbefore with reference to FIG. 1.

The flue gas forwarded in the duct 14 contains residual sulphur dioxide, $SO_2$, that was not captured in the sulphur dioxide removal device 12, described hereinbefore with reference to FIG. 1. The first direct contact cooler 50 is also a high efficiency $SO_2$ absorber operating at low temperature and in the pH range of about 4-6. Absorption of $SO_2$ into a cooling liquid containing water makes the cooling liquid slightly acidic. The following main reaction could illustrate the absorption:

$$SO_2(g) + H_2O \Rightarrow H_2SO_3(aq)$$

Practically all the residual $SO_2$ in the flue gas will be captured in the first direct contact cooler 50 as well as a major portion of the sulphur trioxide, $SO_3$. The pH control requires a balancing act as will be explained later. Due to the low concentration of $SO_2$ in the flue gas, as mentioned hereinbefore the concentration of $SO_2$ in the flue gas forwarded in the duct 14 would typically be 20-200 ppm, the sulphite, $SO_3^{2-}$ (aq), formed in the first direct contact cooler 50 as a result of the absorption of $SO_2$ in the cooling water would naturally become oxidized to sulphate. Oxidation enhancement can be provided by bubbling small quantities of air to the bottom of the first direct contact cooler 50 by means of an air pipe 110, if required. The oxidation reaction could occur according to the following main reaction:

$$H_2SO_3(aq) + \tfrac{1}{2} O_2(g) \Rightarrow H_2SO_4(aq)$$

The sulphuric acid, $H_2SO_4$, thus formed will dissociate in the aqueous solution, and will decrease the pH of the cooling water.

The cooling water leaving the first direct contact cooler 50 via the pipe 80 has a rather low pH, thanks to the absorption of SO2, and is utilized, as will be described hereinafter, for removing ammonia from the flue gas, which is forwarded from the carbon dioxide removal system 20 via the duct 44, in the second direct contact cooler 94.

The flue gas, from which most of the carbon dioxide has been removed, enters the second direct contact cooler 94 via the gas inlet 96. The flue gas entering the second direct contact cooler 94 contains about 100-1000 ppm of ammonia, $NH_3$, and more typically 200-400 ppm of ammonia, depending on the design and operating conditions of the ammonia wash system, i.e., the water wash vessel 38 described hereinbefore with reference to FIG. 1. For environmental reasons and in order to reduce ammonia losses from the process, the ammonia concentration of the flue gas discharged to the atmosphere should be lower than about 10 ppm, and preferably less than about 1 ppm. This can be achieved in the second direct contact cooler 94.

The cooling water being forwarded in the pipe 92 from the cooling tower 84 to the second direct contact cooler 94 has a pH of about 4-6, since the cooling water has absorbed sulphur dioxide, $SO_2$, in the first direct contact cooler 50. Hence, the acid source is the $SO_2$ in the flue gas. The slightly acidic cooling water is used for capturing ammonia from the flue gas entering the second direct contact cooler 94 via the gas inlet 96 and for reheating this flue gas before releasing it to the atmosphere. Thus, the second direct contact cooler 94 is utilized for acid wash of ammonia from the flue gas that has passed through the carbon dioxide removal system 20, described hereinbefore with reference to FIG. 1, and utilizes as a source of this acid wash sulphur dioxide, $SO_2$, that has been removed from the flue gas before such flue gas enters the carbon dioxide removal system 20 and that has been oxidized to sulphate in the first direct contact cooler 50. The slightly acidic cooling water, supplied via the pipe 92 to the second direct contact cooler 94, is an excellent absorbent for the highly soluble low concentration gaseous ammonia of the flue gas supplied via the duct 44 and the gas inlet 96. The ammonia, $NH_3$, of the flue gas supplied via the duct 44 reacts with the oxidized $SO_2$, i.e., the sulphate, of the cooling water supplied via the pipe 92 to form dissolved ammonium sulphate salt, $(NH_4)_2SO_4$, as indicated by the reaction below:

$$2\,NH_3(g) + H_2SO_4(aq) \Rightarrow (NH_4)_2SO_4(aq)$$

It takes 2 moles of ammonia to react with the sulphuric acid formed from 1 mole of $SO_2$, i.e., the desired relation between $SO_2$ in the flue gas supplied via the duct 14 to the first direct contact cooler 50 and the ammonia supplied via the duct 44 to the second direct contact cooler 94 is preferably 1:2, on a molar basis. The volume of the flue gas flow supplied via the duct 14 to the first direct contact cooler 50 is about 10% (dry volume) greater than the volume of the flue gas flow supplied via the duct 44 to the second direct contact cooler 94. Accordingly, when the flue gas supplied to the first direct contact cooler 50 contains, for example, 100 ppm (dry basis) of $SO_2$ it would react and neutralize about 220 ppm (dry basis) of ammonia of the flue gas supplied to the second direct contact cooler 94 via the duct 44.

If the amount of sulphur dioxide, $SO_2$, of the flue gas supplied to the first direct contact cooler 50 via the duct 14 is less than what is required to react and neutralize the ammonia that is emitted from the process, i.e., the carbon dioxide removal process occurring in the carbon dioxide removal system 20 described hereinbefore with reference to FIG. 1, and is contained in the flue gas supplied to the second direct contact cooler 94, then a balancing act is required. Two options are preferable:

1. Adjusting (reducing) the removal efficiency of the sulphur dioxide removal system 12, described hereinbefore with reference to FIG. 1, allowing it to emit more $SO_2$, in sufficient concentration required to fully react with the ammonia. Thus, the removal efficiency of the sulphur dioxide removal system 12 is deliberately decreased, such that more sulphur dioxide, $SO_2$, is removed in the first direct contact cooler 50, making the cooling water supplied to the second contact reactor 94 via the pipe 92 more acidic.
2. Adding sulphuric acid to the loop to maintain the pH. The acid can be added anywhere in the loop, and preferably to the bottom of the first direct contact cooler 50. In FIG. 2 a pipe 112 is operative for supplying sulphuric acid to the tank 62.

If the amount of $NH_3$ in the flue gas supplied to the second direct contact cooler 94 via the duct 44 is less than required to react and neutralize the sulphuric acid formed from $SO_2$ that is emitted from the sulphur dioxide removal system 12, described hereinbefore with reference to FIG. 1, then the ammonia concentration can be increased by adjusting the operation of the ammonia water wash, i.e., the water wash vessel 38 described hereinbefore with reference to FIG. 1, such that the flue gas entering the second direct contact cooler 94 contains more ammonia. As alternative, or additionally, the concentration of $SO_2$ can be reduced by improving the efficiency of the sulphur dioxide removal device 12.

The ammonium sulphate formed in the cooling water is removed from the combined cooling and cleaning system 16 as a bleed liquid stream leaving the tank 104 of the second direct contact cooler 94 via a pipe 114. Fresh water may be supplied as make-up to keep the liquid volume constant in the combined cooling and cleaning system 16.

A control device 116 may be operative for controlling the operation of the combined cooling and cleaning system 16. A pH-meter 118 is operative for measuring the pH of the warm cooling water leaving the first direct contact cooler 50 via the pipe 80 and for sending a signal containing information about the measured pH to the control device 116. In response to such a signal the control device 116 may control the supply of sulphuric acid via the pipe 112. Additionally, or as alternative, the control device 116 may control the sulphur dioxide removal device 12, and/or the water wash vessel 38, both of which have been described hereinbefore with reference to FIG. 1. Still further, the control device 116 may also control a supply of an alkali, such as sodium hydroxide solution, via the pipe 112, or, preferably via a separate pipe, in situations when the measured pH becomes too low, and has to be increased quickly. The control device 116 may also receive a signal from an ammonia concentration analyser 120, which is operative for measuring the concentration of ammonia in the flue gas leaving the combined cooling and cleaning system 16.

Depending on the signal received from the pH-meter 118 the control device 116 may give different orders, as illustrated in Table 3, below:

TABLE 3

Decisions by control device 116

| Signal to control device 116 | Action of control device 116 |
| --- | --- |
| pH above set point | Order decrease of efficiency of sulphur dioxide removal device 12, and/or order supply of sulphuric acid via pipe 112, and/or order increased efficiency of water wash vessel 38 |
| pH below set point | Order increase in efficiency of sulphur dioxide removal device 12, and/or order decreased efficiency of water wash vessel 38, and/or order supply of alkali to cooling liquid |

If the signal from the ammonia concentration analyser 120 indicates that the concentration of ammonia is approaching the emission limit, then the control device 116 may decide to decrease the pH set point, e.g., to set point pH 4.5, to improve the efficiency of the ammonia removal of the second direct contact cooler 94.

Hence, the first direct contact cooler 50 serves to cool the flue gas supplied via the duct 14, to remove sulphur dioxide, $SO_2$, from this flue gas, and to generate a slightly acidic and heated cooling water, from which heat can be recovered in the heat exchanger 82. The second direct contact cooler 94 serves to heat the flue gas supplied via the duct 44, to remove ammonia, $NH_3$, from this flue gas, utilizing the slightly acidic cooling water obtained in the first direct contact cooler 50, the slightly acidic cooling water thereby being neutralized, and to cool the cooling water supplied via the pipe 92.

Figure 3:
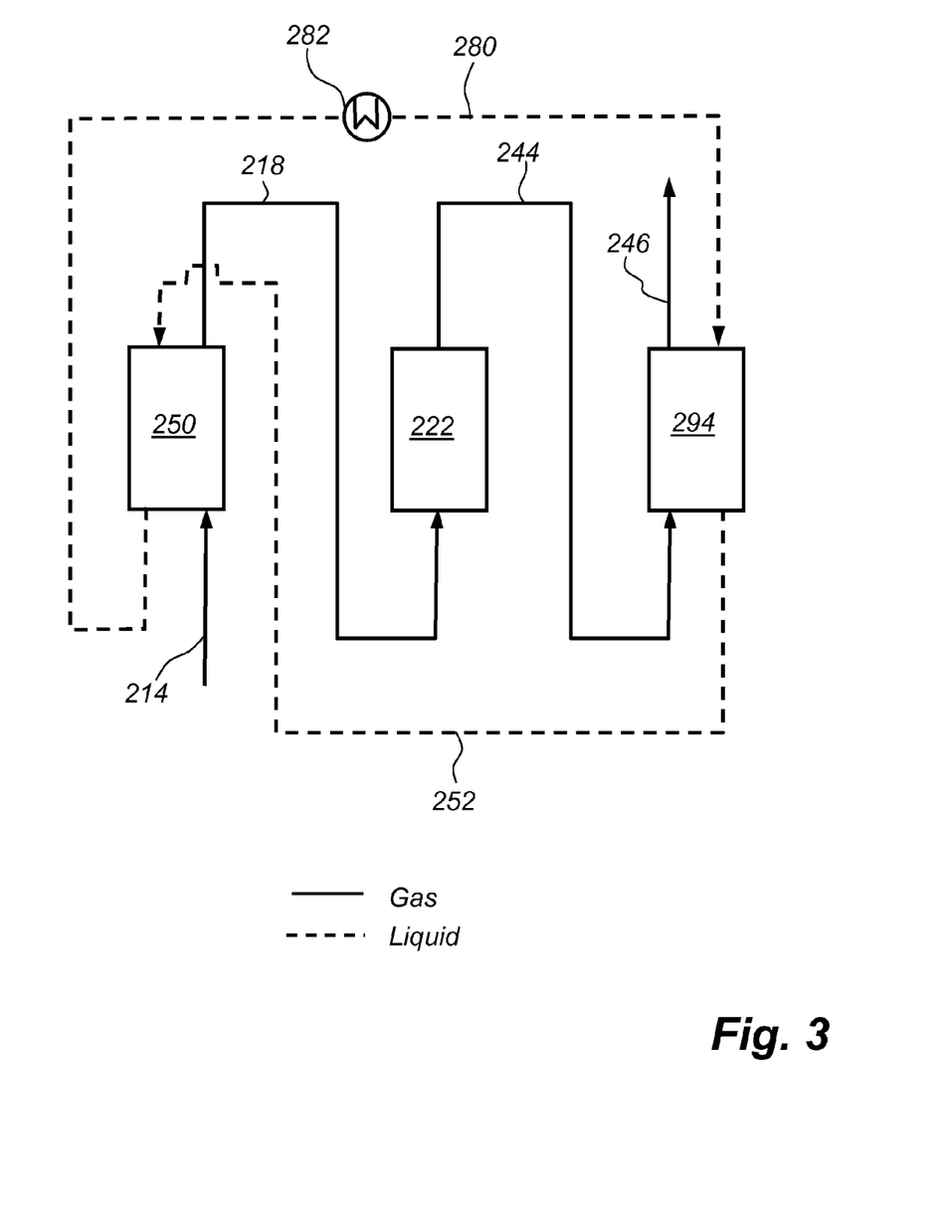
FIG. 3 is a schematic representation of the major steps of a method according to one embodiment of the invention.

FIG. 3 illustrates, in a schematic manner, the major steps of one embodiment of the method of the present invention. The method of cleaning a process gas comprises three major steps.

A first step, which is conducted in a first gas-liquid contacting device 250, comprises cooling the process gas, supplied via a duct 214, by means of bringing the process gas into direct contact with a cooling liquid, supplied via a pipe 252. During the cooling at least a portion of the sulphur dioxide of the process gas is absorbed by the cooling liquid, such that a cooling liquid containing sulphate is formed. This cooling liquid containing sulphate leaves the first gas-liquid contacting device 250 via a pipe 280. The cooled process gas, having a temperature of about 0-20° C., leaves the first gas-liquid contacting device 250 via a duct 218.

In a second step, which is conducted in a $CO_2$-absorber 222, the cooled process gas is brought into contact with an ammoniated solution or slurry. The operation of the $CO_2$-absorber 222 could be similar to what is described in the document WO 2006/022885 with reference to the $CO_2$-absorber with reference number 134 in that document, and also similar to what has been described hereinbefore with reference to FIG. 1 of the present description. A regenerator is to be utilized, but is not illustrated in FIG. 3 for reasons of clarity of illustration. The process gas, from which at least a part of the carbon dioxide has been removed, leaves the $CO_2$-absorber 222 via a duct 244. Due to the process occurring in the $CO_2$-absorber 222 the process gas leaving the $CO_2$-absorber 222 via the duct 244 will contain some ammonia, typically about 100-1000 ppm of ammonia.

In a third step, which is conducted in a second gas-liquid contacting device 294, the process gas containing ammonia, supplied via the duct 244, is brought into contact with the cooling liquid containing sulphate, which is supplied to the second gas-liquid contacting device 294 by means of the pipe 280. A cooler 282, such as a heat exchanger and/or a cooling tower, is connected to the pipe 280 and is operative for cooling the cooling liquid containing sulphate, before such liquid is introduced in the second gas-liquid contacting device 294. In the second gas-liquid contacting device 294 the ammonia of the process gas containing ammonia is at least partly absorbed into the cooling liquid containing sulphate. At the same time the process gas containing ammonia cools the cooling liquid containing sulphate. The cooling liquid containing sulphate leaves the second gas-liquid contacting device 294 via the pipe 252, and is recirculated back to the first gas-liquid contacting device 250. The process gas, from which ammonia has been removed, leaves the second gas-liquid contacting device 294 via a clean gas duct 246, and may be released to the atmosphere. It will be appreciated that the concentration of ammonium sulphate in the circulating cooling liquid will increase over time, and that a bleed-off will be required, not illustrated in FIG. 3. Furthermore, and also not illustrated in FIG. 3, it may be necessary to add some liquid to account for liquid lost in the bleed-off.

To summarize, a gas cleaning system 1, which is operative for cleaning a process gas containing carbon dioxide and sulphur dioxide, comprises a combined cooling and cleaning system 16, and a $CO_2$-absorber 22. The combined cooling and cleaning system 16 comprises a first gas-liquid contacting device 50 located upstream of the $CO_2$-absorber 22 and operative for cooling the process gas by means of a cooling liquid, and for absorbing into the cooling liquid sulphur dioxide of the process gas, such that a cooling liquid containing sulphate is obtained. The combined cooling and cleaning system 16 further comprises a second gas-liquid contacting device 94 located downstream of the $CO_2$-absorber 22 and operative for removing ammonia from the process gas, which has been treated in the $CO_2$-absorber 22, by means of bringing the process gas containing ammonia into contact with the cooling liquid containing sulphate.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of cleaning a process gas containing carbon dioxide and sulphur dioxide, said method including removing, at least partly, carbon dioxide from the process gas by cooling the process gas, and bringing the cooled process gas into contact with an ammoniated solution or slurry absorbing at least a part of the carbon dioxide, comprising the steps of:
    cooling the process gas by bringing the process gas into direct contact with a cooling liquid in a gas-liquid contact device, and absorbing into the cooling liquid at least a part of the sulphur dioxide of the process gas, such that a cooling liquid containing sulphate is obtained,
    further cooling the cooled process gas from the gas-liquid contact device in an additional cooler to provide a further cooled, process gas,
    contacting the further cooled process gas with the ammoniated solution or slurry to remove, at least partly, carbon dioxide from the process gas, and to form a carbon dioxide rich ammoniated solution or slurry and a process gas containing ammonia,
    heating the carbon dioxide rich ammoniated solution or slurry to provide a carbon dioxide gas stream and the ammoniated solution or slurry for removing carbon dioxide from the process gas; and
    removing, at least partly, ammonia from the process gas containing ammonia by bringing the process gas containing ammonia into direct contact with the cooling liquid containing sulphate, wherein the cooling liquid containing sulphate is cooled by the process gas containing ammonia, the thereby cooled cooling liquid being utilized in cooling of the process gas.

2. A method according to claim 1, wherein the ammonia of the process gas containing ammonia and the sulphate of the cooling liquid containing sulphate at least partly react to form ammonium sulphate in aqueous solution.

3. A method according to claim 1, wherein the cooling liquid utilized for cooling the process gas is treated in a heat exchanger for recovering energy.

4. A method according to claim 1, wherein the pH-value of the cooling liquid containing sulphate is controlled to be in the range of pH of about 4-6.

5. A method according to claim 1, the method further comprising:
    prior to bringing the process gas into direct contact with the cooling liquid, removing an amount of sulphur dioxide from the process gas in a sulphur dioxide removal device, and
    controlling sulphur dioxide removal efficiency of the sulphur dioxide removal device to obtain a process gas which comprises a remaining amount of sulphur dioxide which has a relation to the amount of ammonia of the process gas containing ammonia of about 1:2 on a molar basis.

6. A method according to claim 1, the method further comprising:
    partly removing ammonia from the process gas containing ammonia using a water wash device before bringing the process gas containing ammonia into direct contact with the cooling liquid containing sulphate, and
    controlling ammonia removal efficiency of the water wash device to obtain a process gas containing ammonia which comprises a remaining amount of ammonia having a relation to the amount of sulphur dioxide of the process gas of about 2:1 on a molar basis.

7. A method according to claim 1, wherein sulphuric acid is added to the cooling liquid to control its pH-value.

8. A method according to claim 1, wherein the additional cooler is an indirect cooler.

9. A method according to claim 1, wherein the further cooled process gas has a temperature of between about 0 to 20° C.

10. A method according to claim 9, wherein the further cooled process gas has a temperature of between about 0 to 10° C.

11. A method according to claim 4, wherein the pH-value of the cooling liquid containing sulphate is controlled by adjusting at least one of:
    an amount of sulphur dioxide removed from the process gas prior to bringing the process gas into direct contact with the cooling liquid, and
    an amount of ammonia washed from the process gas containing ammonia before bringing the process gas containing ammonia into direct contact with the cooling liquid containing sulphate.

12. A method of cleaning a process gas containing carbon dioxide and sulphur dioxide, said method including:
    (a) cooling the process gas by bringing the process gas into direct contact with a cooling liquid, and absorbing into the cooling liquid at least a part of the sulphur dioxide of the process gas, such that a cooling liquid containing sulphate and a cooled process gas are obtained;
    (b) further cooling the cooled process gas to provide a further cooled process gas;
    (c) contacting the further cooled process gas with an ammoniated solution or slurry to remove, at least partly, carbon dioxide from the further cooled process gas, and to form a carbon dioxide rich ammoniated solution or slurry and a process gas containing ammonia;
    (d) heating the carbon dioxide rich ammoniated solution or slurry to provide a carbon dioxide gas stream and the ammoniated solution or slurry used for removing carbon dioxide from the process gas in step (c);
    (e) removing an amount of ammonia from the process gas containing ammonia by bringing the process gas containing ammonia into contact with wash water; and
    (f) removing a further amount of ammonia from the process gas containing ammonia, subsequent to step (e), by bringing the process gas containing ammonia into direct contact with the cooling liquid containing sulphate, wherein the cooling liquid containing sulphate is cooled by the process gas containing ammonia and the thereby cooled cooling liquid is used for cooling the process gas in step (a).

13. The method of claim 12, further comprising:
    maintaining a pH-value of the cooling liquid containing sulphate within a predetermined range of pH values by adjusting the amount of ammonia washed from the process gas in step (e).

14. The method of claim 12, further comprising:
    adjusting an amount of ammonia in the process gas containing ammonia prior to step (f) to be about 2:1 on a molar basis to an amount of sulphur dioxide in the process gas prior to step (a) by adjusting the amount of ammonia washed from the process gas in step (e).

15. A method of cleaning a process gas containing carbon dioxide and sulphur dioxide, said method including:
    (a) removing an amount of sulphur dioxide from the process gas using a sulphur dioxide removal device;

(b) cooling the process gas from the sulphur dioxide removal device by bringing the process gas from the sulphur dioxide removal device into direct contact with a cooling liquid, and absorbing into the cooling liquid a further amount of the sulphur dioxide of the process gas, such that a cooling liquid containing sulphate and a cooled process gas are obtained;

(c) further cooling the cooled process gas to provide a further cooled process gas;

(d) contacting the further cooled process gas with an ammoniated solution or slurry to remove, at least partly, carbon dioxide from the process gas, and to form a carbon dioxide rich ammoniated solution or slurry and a process gas containing ammonia;

(e) heating the carbon dioxide rich ammoniated solution or slurry to provide a carbon dioxide gas stream and the ammoniated solution or slurry used for removing carbon dioxide from the process gas in step (d);

(f) removing an amount of ammonia from the process gas containing ammonia by bringing the process gas containing ammonia into direct contact with the cooling liquid containing sulphate, wherein the cooling liquid containing sulphate is cooled by the process gas containing ammonia and the thereby cooled cooling liquid is used for cooling the process gas in step (a); and (g) controlling the amount of ammonia removed from the process gas containing ammonia in step (f) by adjusting the amount of sulphur dioxide removed from the process gas using the sulphur dioxide removal device.

16. The method of claim 15, further comprising:

maintaining a pH-value of the cooling liquid containing sulphate within a predetermined range of pH values by adjusting the amount of sulphur dioxide removed from the process gas using the sulphur dioxide removal device.

17. The method of claim 15, wherein the amount of sulphur dioxide in the process gas from the sulphur dioxide removal device is about 1:2 on a molar basis to the amount of ammonia in the process gas containing ammonia prior to step (f).

* * * * *